United States Patent

Provost

[11] Patent Number: 5,722,229
[45] Date of Patent: Mar. 3, 1998

[54] AUXILIARY GAS TURBINE ENGINES

[76] Inventor: Michael J. Provost, 85 Balmoral Drive, Bramcote Hills, Nottingham NG9 3FR, England

[21] Appl. No.: 480,292

[22] Filed: Jun. 7, 1995

[30] Foreign Application Priority Data

Jul. 30, 1994 [GB] United Kingdom ............. 9415436

[51] Int. Cl.$^6$ .................................................. F02C 6/08
[52] U.S. Cl. ........................................... 60/39.07; 60/728
[58] Field of Search ........................... 60/39.07, 39.511, 60/728, 39.27, 269; 454/76

[56] References Cited

U.S. PATENT DOCUMENTS

| | | | |
|---|---|---|---|
| 2,322,987 | 6/1943 | West | 60/39.27 |
| 2,618,470 | 11/1952 | Brown et al. | 60/39.07 |
| 2,777,301 | 1/1957 | Kuhn | 60/39.07 |
| 2,845,776 | 8/1958 | Traupel | 60/39.07 |
| 3,705,775 | 12/1972 | Rioux | 60/269 |
| 3,835,642 | 9/1974 | Amann . | |
| 3,997,283 | 12/1976 | Kronogard . | |
| 4,091,613 | 5/1978 | Young | 60/39.07 |
| 4,494,372 | 1/1985 | Cronin . | |
| 4,503,666 | 3/1985 | Christoff | 60/39.07 |
| 4,514,976 | 5/1985 | Christoff . | |
| 4,546,939 | 10/1985 | Cronin . | |
| 4,706,908 | 11/1987 | Huffman et al. . | |
| 4,864,812 | 9/1989 | Rodgers et al. . | |
| 4,916,893 | 4/1990 | Rodgers . | |
| 5,039,281 | 8/1991 | Johnston . | |

FOREIGN PATENT DOCUMENTS

| | | |
|---|---|---|
| 2 076 450 | 10/1970 | France . |
| 1212875 | 11/1970 | United Kingdom . |
| 1340363 | 12/1973 | United Kingdom . |
| 2222031 | 2/1990 | United Kingdom . |
| 2242235 | 9/1991 | United Kingdom . |

Primary Examiner—Michael Koczo
Attorney, Agent, or Firm—Cushman, Darby & Cushman Intellectual Property Group of Pillsbury Madison & Sutro LLP

[57] ABSTRACT

An auxiliary gas turbine engine comprises: a load compressor (110); a cabin air supply duct (115) which supplies at least some of the air from the exit of the load compressor to the aircraft cabin; a high pressure compressor (120) which further compresses the remaining air from the exit of the load compressor; a combustor (130); a turbine (140); an electrical generator (150) driven by the turbine; an electric motor (160) driven by the electrical output of the generator, the electric motor in turn driving the load compressor; and at least one air heater/cooler (170A, 170B or 170C) comprising a heat exchanger matrix (172A, 172B or 172C) located in the appropriate air duct and a reversible refrigeration plant or heat pump (174A, 174B or 174C) which is electrically powered from the generator so that it can either cool or heat the air passing through the matrix. The load compressor and heat exchanger(s) together produce air at the pressure and temperature required for supply to the aircraft cabin.

19 Claims, 7 Drawing Sheets

AUXILIARY GAS TURBINE ENGINES

TECHNICAL FIELD

This invention relates generally to auxiliary gas turbine engines for aircraft, particularly civil passenger transport aircraft.

BACKGROUND ART

Civil passenger transport aircraft are provided with cabin pressurization and air conditioning systems and electrical power supply systems. It is usual for main turbojet, turboprop or turbofan propulsion engines to have one or more offtakes from their compressors for supply of compressed air to the cabin pressurisation and air conditioning systems. The main engines are also used to drive an electrical generator to provide electrical power.

Auxiliary power units (APUs) were at one time provided solely for use while aircraft were on the ground, to render them independent of ground-based air and power sources. Later, it was considered sensible to utilise APUs as backup sources of air and power during flight to take air and power offtake loads away from the main propulsion engines if one or more of them failed. This required the APUs to have a more sophisticated design because they had to be startable at high altitudes and low temperatures.

More recently, it has been proposed that APUs be utilised to help to optimize fuel burn of the main engines during descent from cruise altitude. This proposal recognises that, due to the low propulsive thrust required in the descent phase of flight, the lowest attainable throttle setting is that necessary to supply aircraft pressurisation, air conditioning and electrical power demands from the main engine air offtakes and electrical generators. Consequently, the main engines produce more propulsive thrust than is needed, thereby slowing the rate of descent and using more fuel. In such a situation, APUs can be utilised to reduce fuel burn by starting them before beginning the descent phase, thus enabling the engines to be throttled back to minimum thrust. This gives a faster descent, which can also be initiated later in the flight, so further reducing total fuel burn per flight.

Due to continued growth in aircraft passenger capacity, allied with the adoption of large twin engined aircraft for passenger transport, the number of passengers supplied with air and power from each main engine has tended to increase. At the same time, improved efficiency in turbofan engines, allied with continued increases in bypass ratios, has increased the proportion of air which bypasses the compressor, so that air offtakes for pressurisation and air conditioning have become a larger fraction of the airflow through the compressor. Increasingly, accommodation of the air offtakes requires special compressor design measures to reduce the likelihood of flow instabilities as the offtake air demand varies.

A further difficulty associated with air offtakes from the main engine compressors is in the installation of the ducting required to bring the compressed air from the engines to the pressurised hull. Drag minimisation requires that support structures such as pylons have low frontal area and are elongated in the direction of flight, but the need to install air ducting in them increases frontal area above that needed solely for structural reasons.

Following from the above, an object of the present invention is to provide aircraft with fuel efficient, high performance auxiliary gas turbine engines which are operational on the ground and throughout the aircraft's flight envelope to supply all or at least a substantial proportion of the aircraft's pressurised air and electrical power requirements, thereby allowing greater optimisation of the performance of the main propulsion engines for propulsion purposes.

Another object of the invention is to reduce or eliminate the need for air ducting in the wings and the main engine support structures.

A further object is to reduce the installed weight of the main propulsion engines in an aircraft by reducing or eliminating the need for them to drive associated electrical power generators and by reducing or eliminating the engine ducting, valves and control means associated with air offtakes from the main engine compressors.

A major object is to enable better design optimisation of an auxiliary gas turbine engine's component parts. A related object is to enable flexibility in positioning of an auxiliary gas turbine engine's component parts with respect to the airframe in which it is installed.

A particularly desirable object of the invention is to increase passenger comfort by enabling design of auxiliary gas turbine engines which can supply more air per passenger than is currently supplied by air offtakes from main propulsion engines.

SUMMARY OF THE INVENTION

According to the present invention, an auxiliary gas turbine engine for an aircraft includes;

an air intake, a load compressor for compressing air supplied from the air intake, a cabin air supply duct for supplying at least some of the air from the load compressor as air to the aircraft cabin, a combustor for burning fuel in air supplied by the load compressor, a turbine driven by the combustion products of the combustor, turbine exhaust means, variable speed drive means for transferring power from the turbine to drive the load compressor, and heat exchanger means for adjusting the temperature of the air before use in the aircraft cabin.

The term "load compressor" is used because the air requirement for the cabin is a load on its output of compressed air and to distinguish it from any further stage of air compression which may be present in the engine.

The variable speed drive means enables the load compressor to be run at a speed which is independent of the speed of the turbine and therefore at a suitable pressure ratio to produce air at the correct pressure for pressurisation of the aircraft cabin, whereas the heat exchanger means enables adjustment of the temperature of the air passed from the load compressor to the cabin to obtain the correct temperature for the cabin. The load compressor and heat exchanger means work together to produce air at the required pressure and temperature without further air conditioning being required, other than humidity control, which is not currently provided in aircraft for weight reasons.

Preferably, the load compressor is in flow series with a high pressure (HP) compressor, the load compressor acting to supercharge the HP compressor and the HP compressor supplying air to the combustor. The HP compressor may be driven either directly by the turbine, or by transfer of power from the turbine through further variable speed drive means.

Since the load compressor is not directly driven by the turbine, it can, if desired, be positioned remotely from the HP compressor and/or the combustor, with air being carried between these components by ducting. In some embodiments of the invention, the aircraft cabin itself may be used to carry some or all of the air passing from the load compressor to the HP compressor and/or the combustor. Similarly, if the HP compressor is not directly driven by the turbine, it can also be positioned remotely from the the combustor, if desired.

To maximise flexibility in layout within the airframe, and to minimise both weight and loss of overall engine efficiency, variable speed drive means for transmitting power from the turbine to the load compressor preferably comprises an electrical generator driven directly by the turbine, and an electric motor driven by the electrical output of the generator, the electric motor in turn driving the compressor.

Similarly, the further variable speed drive means for transmitting power from the turbine to the HP compressor preferably comprises a further electric motor driven by the electrical output of the generator, the electric motor in turn driving the HP compressor.

It is preferred that the electrical generator also supplies the electrical power requirements of the aircraft.

Alternative variable speed drive means can be envisaged within the ambit of the invention, such as geared, hydraulic and pneumatic drives for transferring power from the turbine to a compressor. Such mechanical, hydraulic or pneumatic power transfer could be used in conjunction with a turbine driven electrical generator for supplying the electrical power requirements of the aircraft.

The heat exchanger means includes a heat exchanger matrix located before and/or after the load compressor to either cool or heat the air passing through the matrix. If required for adequate control of cabin air temperature, the heat exchanger means further includes a heat pump powered through drive means from the turbine so that it can either cool or heat air passing through the matrix. Preferably, the drive means for the heat pump comprises an electric motor driven by the turbine-driven electrical generator.

As an alternative to the use of a heat pump to heat the air passing through the heat exchanger matrix, the matrix could incorporate electrical heating elements drawing power from the generator.

In a first variation of engine layout, a heat exchanger matrix of the heat exchanger means is located in the air intake to heat or cool the air before it enters the load compressor. In a second variation of engine layout, a heat exchanger matrix is located in the cabin air supply duct to heat or cool the air after it has passed through the load compressor but before it is used for air conditioning of the aircraft. In a third possible variation, a heat exchanger matrix is located at the outlet of the load compressor to heat or cool all the air after it has passed therethrough, before it enters the cabin air supply duct and the HP compressor, if present.

The above three locations for a heat exchanger matrix are not mutually exclusive and may be used in any advantageous combination. This enables switching of the heating or cooling effect to the optimum position for a given flight condition. In particular, it may be advantageous to locate a heat exchanger matrix in the air intake and modify its effect by a further heat exchanger matrix located in the cabin air supply duct or at the outlet from the load compressor.

In some embodiments of the invention, the aircraft cabin is used to carry some or all of the air passing from the load compressor to the HP compressor and/or the combustor. In this case, there are only two locations required for effective use of heat exchangers, i.e., before the load compressor (in the air intake) and at the load compressor's outlet. In these embodiments, a heat exchanger at the load compressor's outlet would have to adjust the temperature of all air passed out of the load compressor to that required in the cabin.

To increase the engine efficiency and reduce fuel consumption, an exhaust heat recuperator may be employed to heat the air from the compressor(s) before it enters the combustor. Preferably, the recuperator comprises a heat exchange matrix built into the turbine outlet duct.

To minimise emissions of pollutants from the combustion process, the combustor may be of the lean burn type.

The invention further includes an aircraft having installed therein an auxiliary gas turbine engine as described above.

BRIEF DESCRIPTION OF THE DRAWINGS

Exemplary embodiments of the invention will now be described with reference to the accompanying drawings, in which.

DETAILED DESCRIPTION OF DRAWINGS

Prior Art APU Configuration

Figure 4:
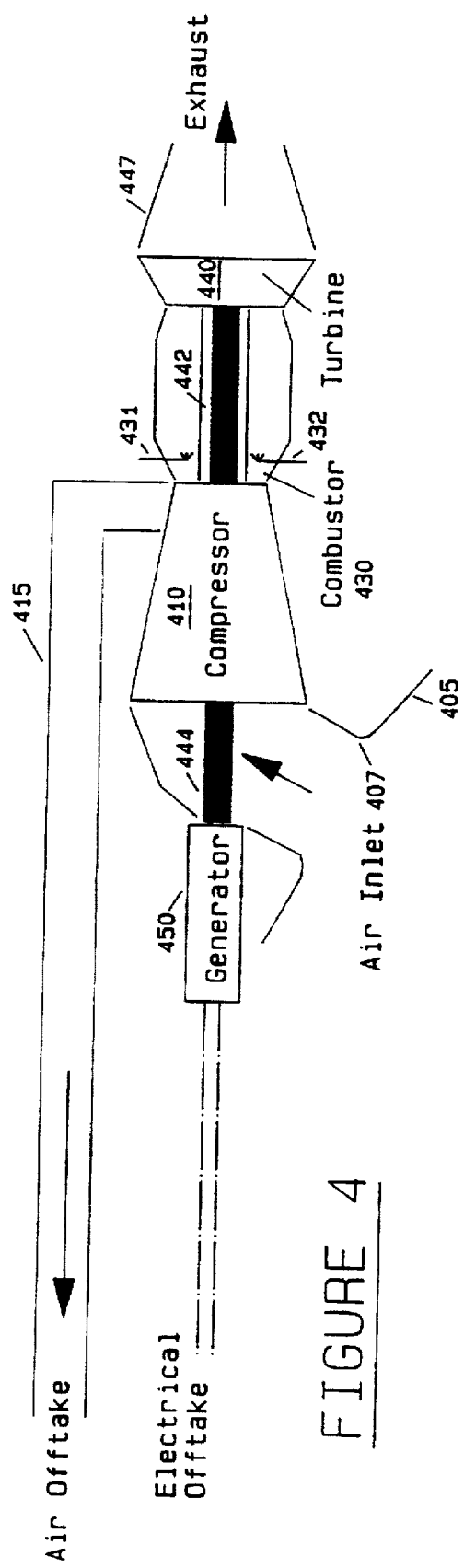
FIG. 4 is a schematic diagram of a known type of auxiliary gas turbine engine.

In FIG. 4, a known common type of APU installed, e.g., near the tail of a civil passenger aircraft comprises, in flow series; an air inlet 407 in an external surface 405 of the aircraft, a compressor 410, a single stage combustor 430, a turbine 440 and an exhaust nozzle 447 from which exhaust gases exit to atmosphere. The turbine 440 may be of the centrifugal or the axial flow type and if the latter will consist of one, two or more rotating stages of turbine blades. The compressor 410 may be of the centrifugal or the axial flow type and if the latter will consist of several rotating stages of compressor blades. Compressor 410 and turbine 440 are mounted on a common shaft 442 so that the turbine, driven by expanding high temperature combustion gases from the combustor 430, in turn drives the compressor 410 to compress the air before combustion.

Combustor 430 burns ordinary aviation fuel in the air supplied by compressor 410. The combustion process is of the conventional rich burn, diffusion flame type, with dilution air added downstream of the burner nozzles 431, 432 to encourage complete combustion and to partially quench the combustion process before excessive amounts of oxides of nitrogen can be produced. Nevertheless, appreciable amounts of pollutants may be produced by this type of combustion process.

Some of the air at or near the high pressure end of the compressor 410 can be selectively bled off into an air supply duct 415 for use in air conditioning of the passenger cabin, and/or for de-icing flight and control surfaces of the aircraft.

Extending from the front of the compressor 410 is a shaft 444, whereby power from the turbine 440 in excess of that needed to drive compressor 410 is used to drive an electrical generator 450, sometimes through gearing (not shown). This provides electrical power for aircraft systems.

In this arrangement, the turbine and compressor are both running at the same rotational speed, which will not be optimum for both components throughout the APU's operational range.

Power Ratings of Configurations 1 to 3 and Alternative Configurations 1 to 3

With respect to the amount of power generated by the auxiliary gas turbine engines described with reference to the accompanying FIGS. 1 to 3 and 5 to 7, the performance calculations underlying the description assume that each is sized so that two of them are able to supply all the air conditioning and electrical power requirements for a large twin-engined civil passenger transport aircraft. Two auxiliary gas turbine engines have been specified in order to meet the same reliability criteria as are imposed by international airworthiness authorities' regulations in respect of extended range twin-engine operations (ETOPS) for the main propulsion engines of civil passenger transport aircraft.

Hence, with respect to electrical power for aircraft and passenger services, it has been assumed that each auxiliary gas turbine engine must supply a total power of 400 kW. With respect to air conditioning capability, such an aircraft can typically carry a total of 375 passengers. Using current cabin air supply technology, each passenger is assumed to require about 0.8 lb/min of cabin air each, a total of about 300 lb/min of air. However, particularly with a full passenger load, cabin air quality tends to be somewhat worse than in an ordinary indoor environment at the same temperature and pressure. In fact, some stale air is usually recirculated through the cabin to reduce the amount of air required to be taken from the main propulsion engines. Consequently, to improve passenger comfort, it will be assumed for the purposes of the present description that each passenger requires 1.2 lb/min of air each, 50% more than current practice, requiring each auxiliary gas turbine engine to supply 225 lb/min.

The auxiliary gas turbine engines of the FIGS. 1 to 3 and 5 to 7 are designed to supply air to the aircraft cabin at a temperature of (typically) 24° C. and a pressure which is the lesser of sea level (14.696 psia) or a predetermined amount above the ambient pressure at the altitude at which the aircraft is flying. Typically, cabin pressure is 7.5 psi above ambient during cruise, but the exact value is determined by the maximum differential pressure between inside and outside that the cabin structure can safely withstand.

Generic Description—Configurations 1 to 3 and Alternative Configurations 1 to 3

Figure 1:
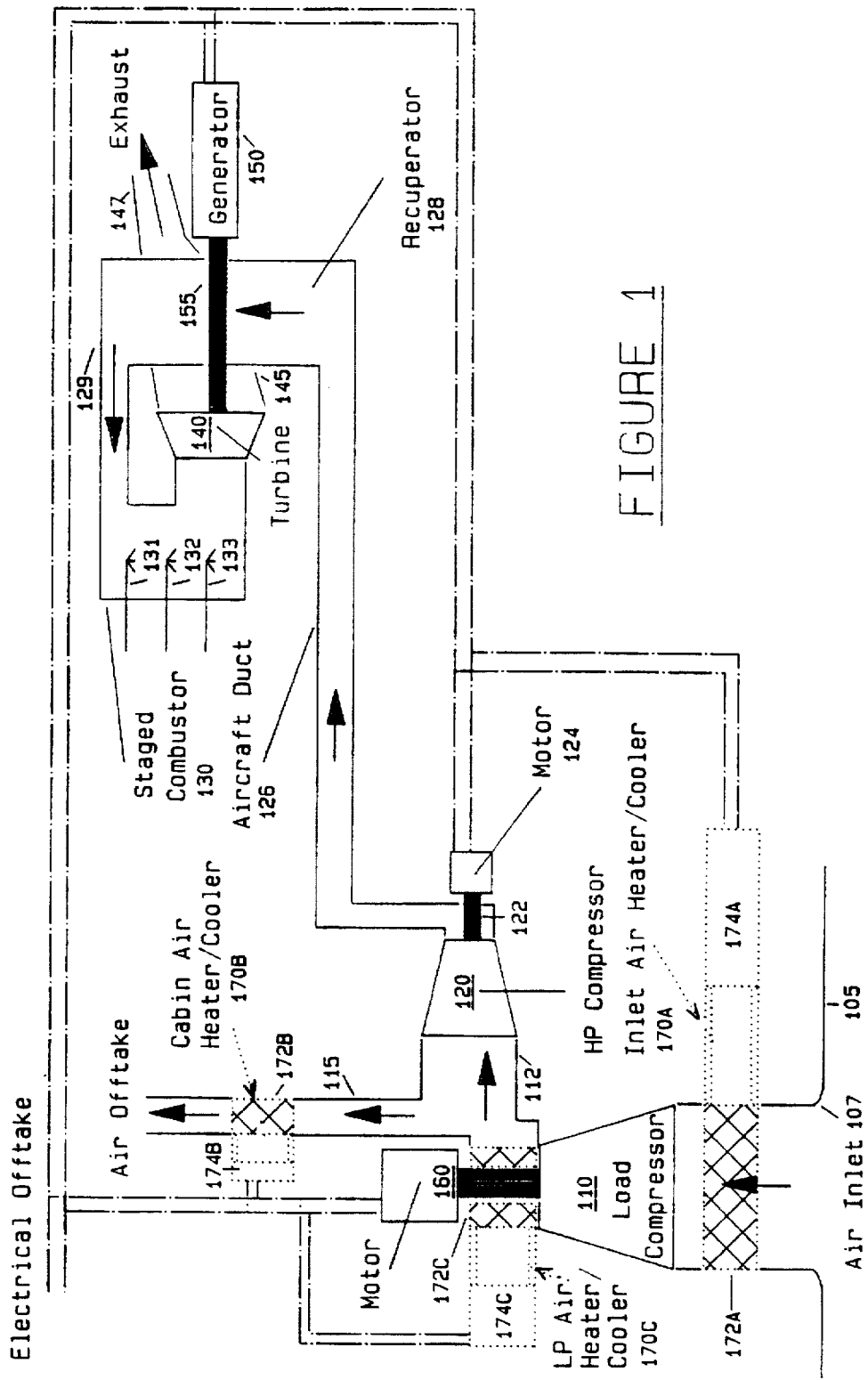
FIG. 1 is a schematic diagram of one basic configuration of an auxiliary gas turbine engine according to the invention, showing how various component parts of the engine may be connected together.
Figure 2:
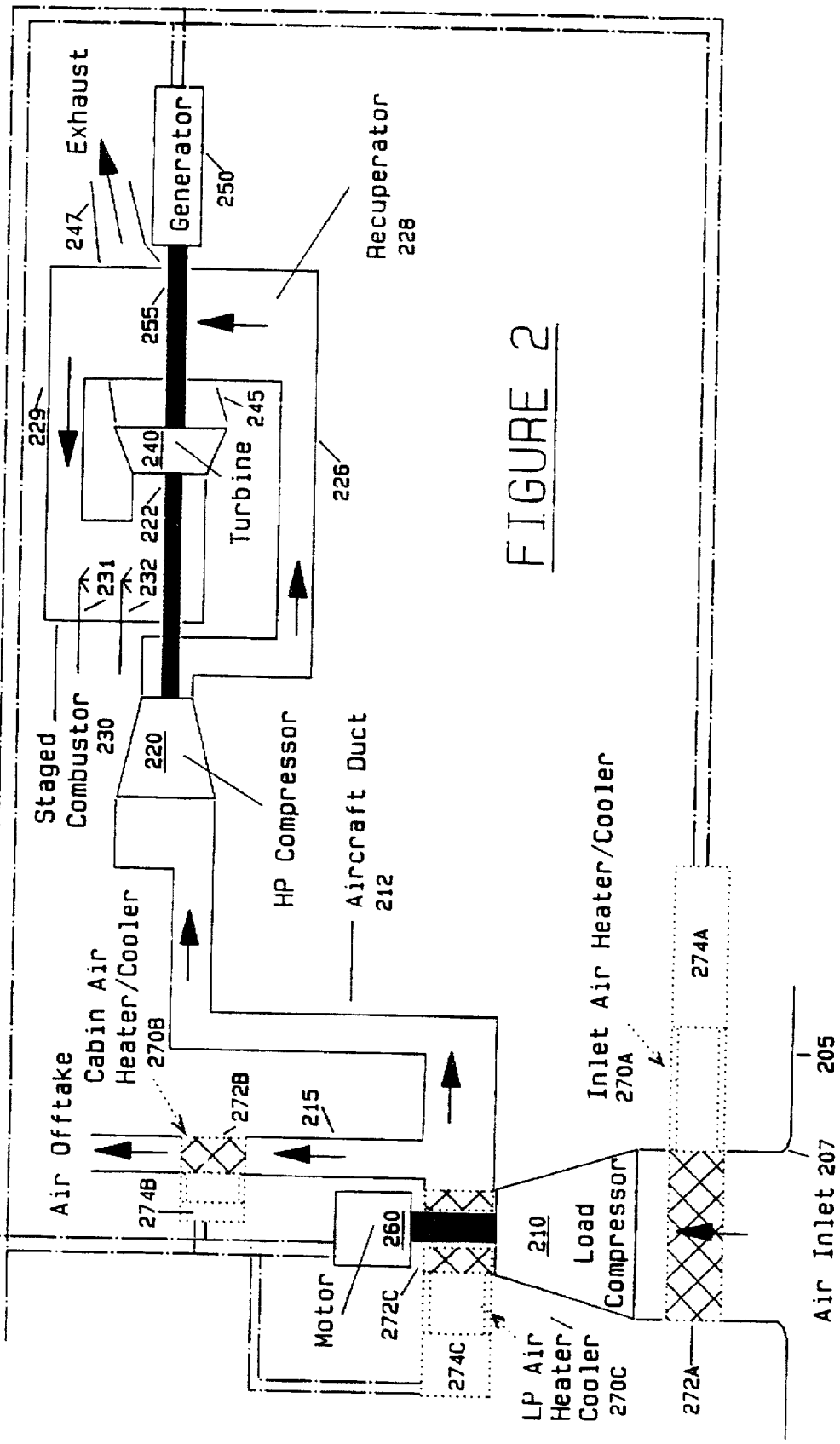
FIGS. 2 and 3 are similar diagrams illustrating two alternative basic configurations which may be employed in accordance with the invention.
Figure 3:
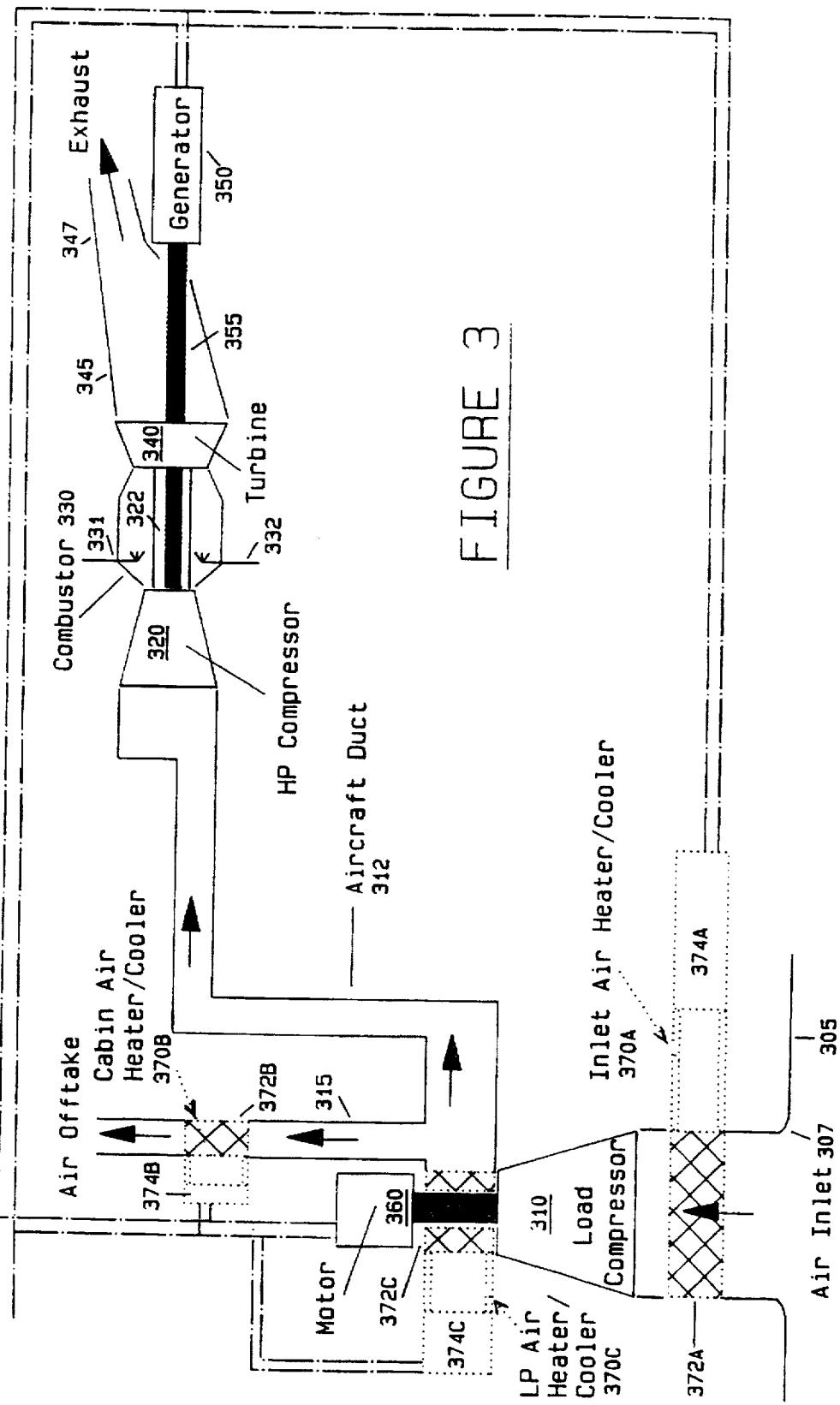
Figure 5:
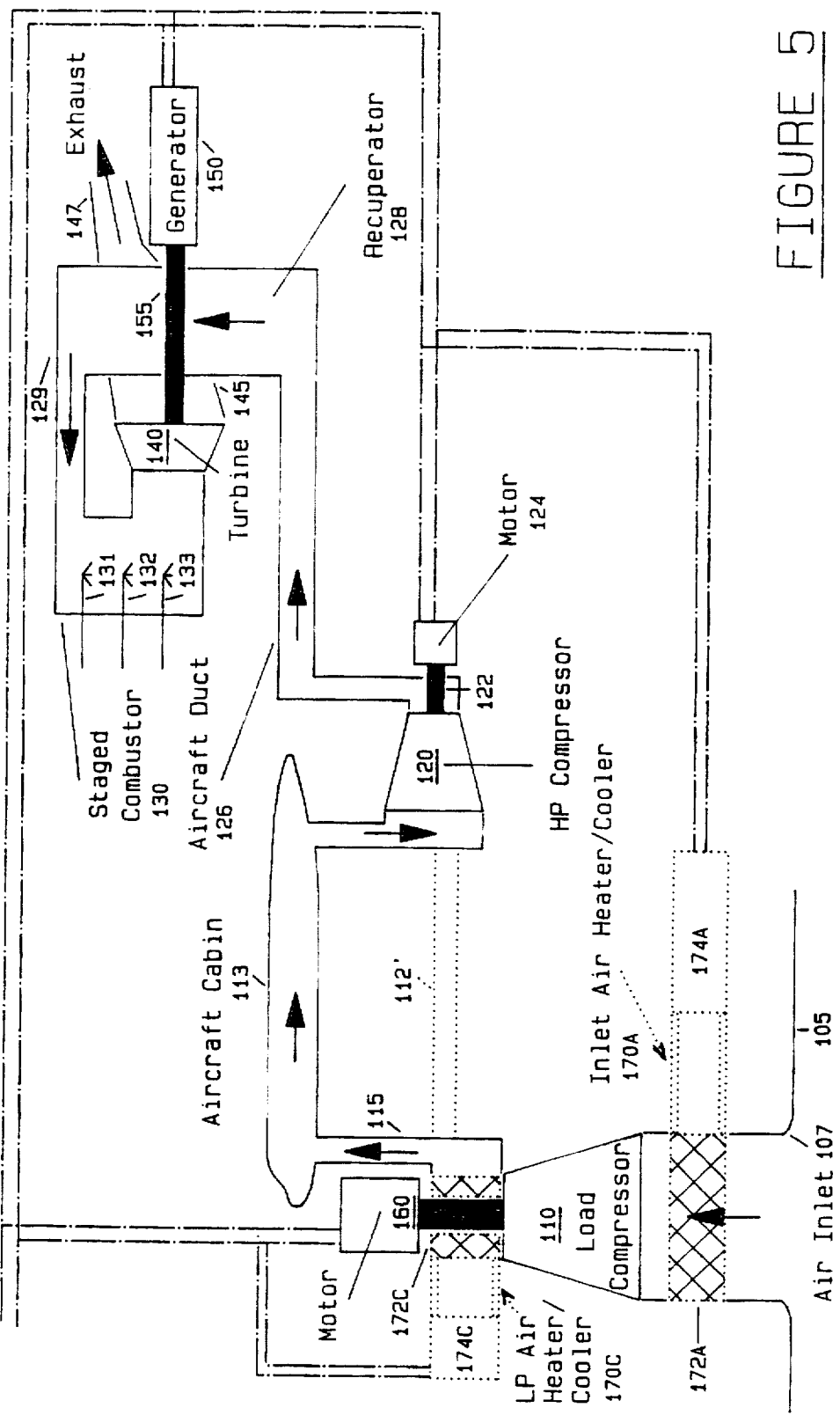
FIGS. 5 to 7 illustrate an alternative implementation of each of the three basic configurations shown in FIGS. 1 to 3 respectively.
Figure 6:
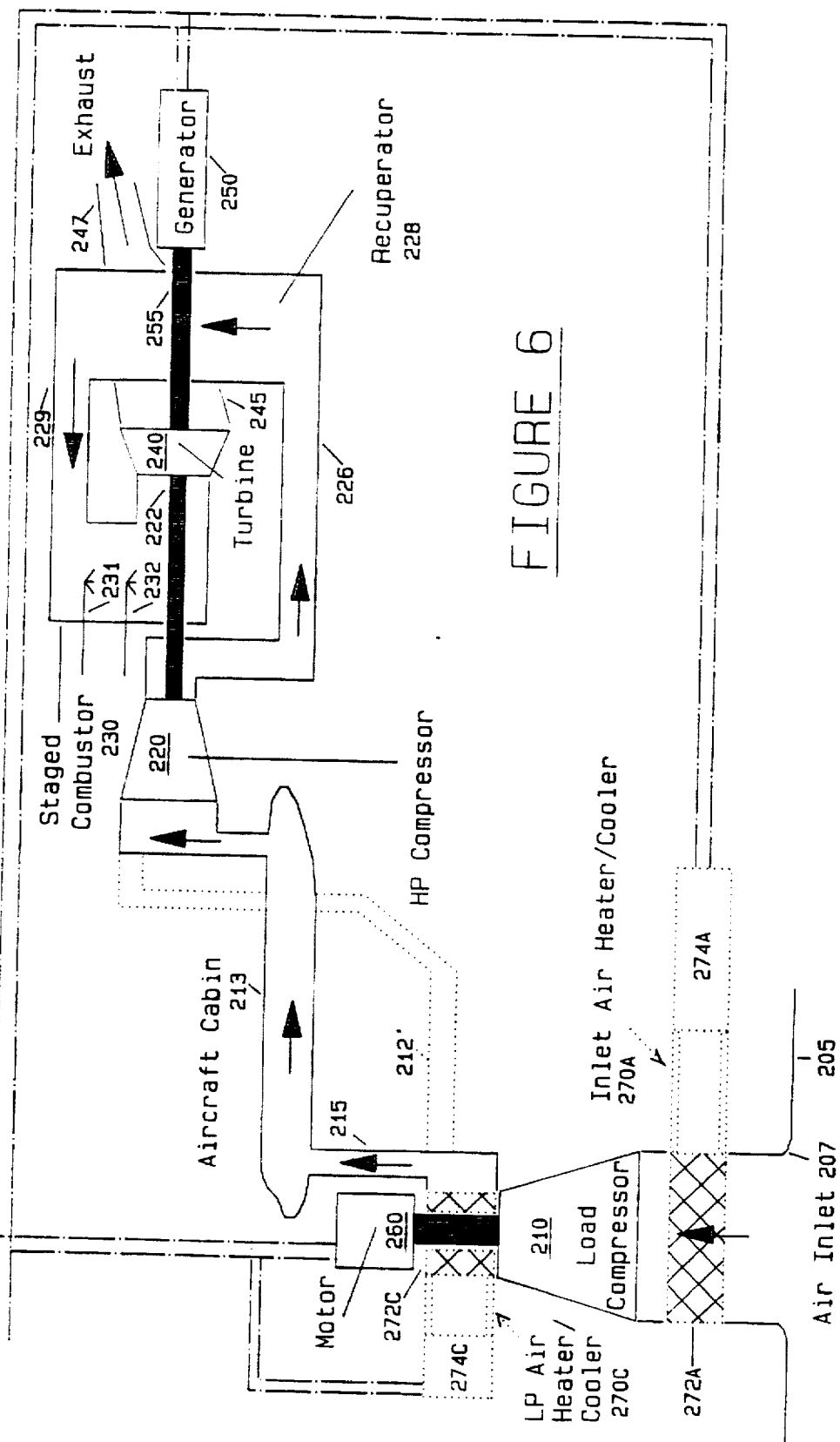
Figure 7:
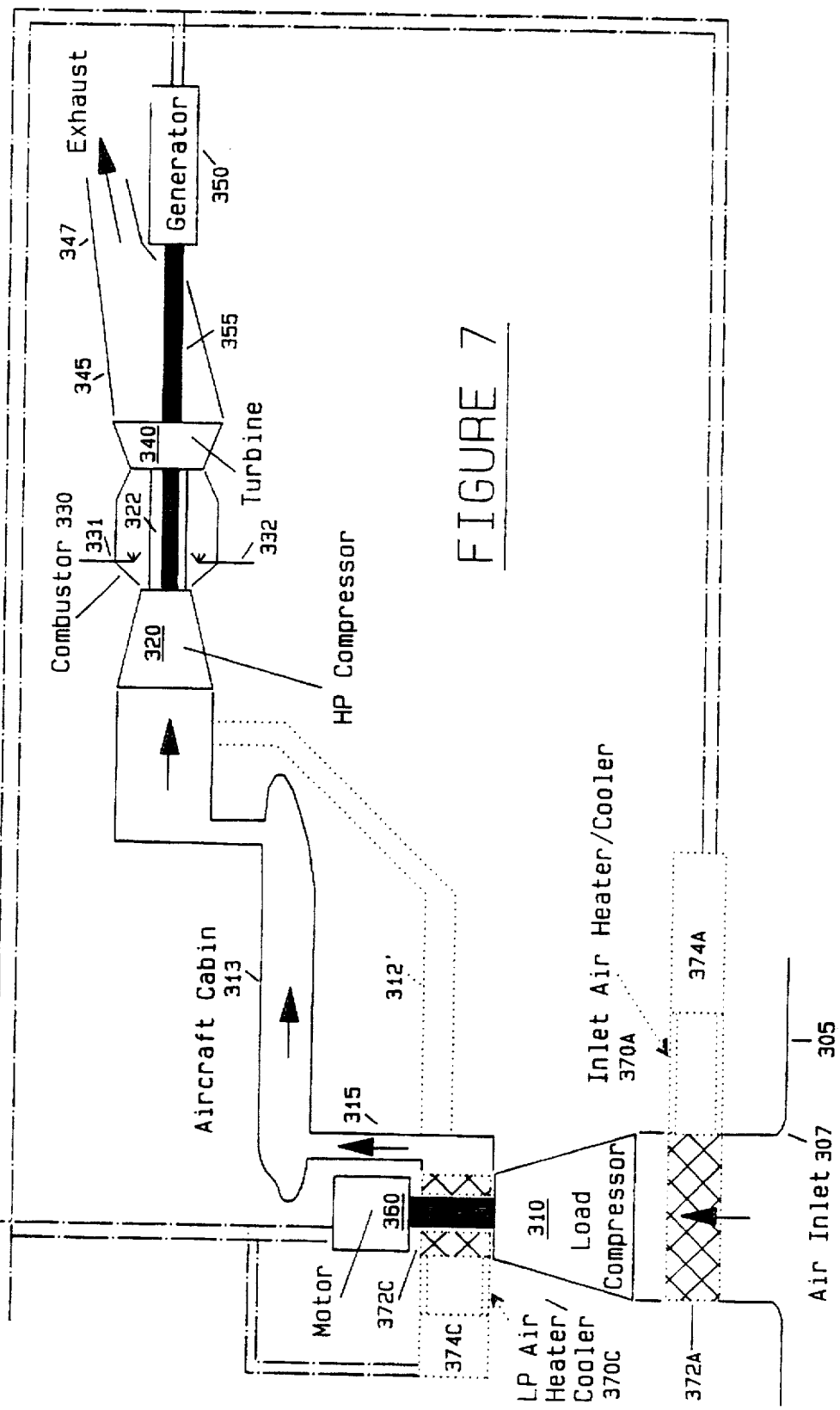

Performance calculations have been carried out for three basic configurations of auxiliary gas turbine engine, each basic configuration having five variations. Each of FIGS. 1 to 3 illustrate three variations of a respective basic configuration, whereas each of FIGS. 5 to 7 illustrate a further two variations of an alternative implementation of each of the three basic configurations of FIGS. 1 to 3. In the Figures, components with similar functions in the different engine configurations are given similar reference numbers, but preceded by a configuration prefix number. For example, each of the basic engine configurations 1 to 3 in FIGS. 1 to 3 and 5 to 7 respectively have a low pressure (LP) or load compressor. In FIGS. 1 and 5 its reference number is 110, in FIGS. 2 and 6 its reference number is 210, and so on.

In all three illustrated basic configurations of the invention, the following components of the auxiliary gas turbine engine are present in some form (though their construction, location or mode of operation may differ between configurations, as described later): an air inlet 107, a load compressor 110; a cabin air supply duct 115 for supplying some or all of the air from the exit of the load compressor 110 to the aircraft cabin; a high pressure (HP) compressor 120 which further compresses the remaining air from the exit of the load compressor 110; a combustor 130 which burns ordinary aviation fuel in the air supplied by the HP compressor 120; a turbine 140 driven by the combustion products of the combustor; an electrical generator 150 driven through a shaft 155 by the turbine 140; an electric motor 160 driven by the electrical output of the generator 150, the electric motor 160 in turn driving the load compressor 110; and an air heater/cooler 170A or 170C comprising a heat exchanger matrix 172A or 172C located in the appropriate air duct and a reversible refrigeration plant or heat pump 174A or 174C which is electrically powered from the generator 150 so that it can either cool or heat the air passing through the matrix.

In each of FIGS. 1 to 3, there are three positions A,B,C shown for an air heater/cooler 170,270,370 all shown in dotted lines in each Figure. However, in FIGS. 5 to 7—due to use of the aircraft cabin to duct some or all of the air between the load compressor 110 and subsequent components of the auxiliary gas turbine engine—there are only two positions A and C for an air heater/cooler 170,270,370 again shown in dotted lines.

In position A, an air heater/cooler 170A heats or cools the air before it enters the load compressor. In position C, an air heater/cooler 170C is sited at the outlet of the load compressor 110 to heat or cool all the air exiting therefrom, before it enters the cabin air supply duct 115 and the HP compressor 120. In position B (FIGS. 1 to 3 only), an air heater/cooler 170B, comprising a heat exchanger matrix 172B, is located in the cabin air supply duct 115. It is linked to a reversible refrigeration plant or heat pump 174B electrically powered from the generator 150, so that it can either cool or heat the air supplied to the cabin after its exit from the load compressor 110 without affecting air separately supplied through duct 112 to the downstream components of the auxiliary gas turbine engine.

The implications in terms of the performance of the auxiliary gas turbine engines incorporating these variations will be detailed later. However, it should be noted here that air heater/coolers 170B or 170C may be used to modify the effect of air heater/cooler 170A, rather than to substitute for it.

In all three illustrated basic configurations, the load compressor 110, 210, 310 is driven by the electric motor 160, 260, 360 and is remotely sited from the combustor 130, 230, 330, the turbine 140, 240, 340 and the electrical generator 150, 250, 350. This layout differs from the compact design usually employed for auxiliary power units (APUs) in aircraft, in which the whole unit is contained within a single housing and is localized in one part of the aircraft. Although separation of the load compressor from other parts of the power unit in designs 110 according to the present invention does impose some losses in unit efficiency due to the need for ducting to connect the separated components, it is found that such losses are acceptable for the following reasons.

(i) The load compressor can be sited in a more convenient place in the aircraft, so minimizing both the length of ducting required to bring air from outside the aircraft to the inlet of the load compressor, and the length of ducting required to supply air to the cabin.

(2) In distinction from the normal layout of an APU, the invention provides separate load and HP compressors running on different shafts, whose rotational speeds can vary separately. Plainly, their relative speeds can be optimized for greatest efficiency to maximize the pressure ratio attainable in each. Furthermore, the load compressor 25 provides all the cabin air requirement while acting as a booster for the HP compressor, enabling the latter component to be compact and lightweight.

(3) Losses can be minimized by use of optimized duct shapes and dimensions.

(4) As shown in FIGS. 5 to 7, the aircraft cabin itself can be used to carry some or all of the air from the load compressor to the HP compressor, because by using the heater/cooler 170A and/or 170C, all the air output from the load compressor 110 can be adjusted to the desired level of pressure and temperature for passenger comfort.

Although FIGS. 1 to 3 and 5 to 7 all show an HP compressor as well as the load compressor, this may not be necessary for all aircraft types. Aircraft with low electrical power requirements and/or requiring low quantities of air for the cabin air supply may not require a powerful generator 150, so a combustor burning fuel in low pressure air direct from load compressor 110 may provide sufficient power.

In interpreting the FIGS. 1 to 3 and 5 to 7, it should be remembered that they are schematic and that the layout will be optimized for particular aircraft installations. Therefore, the ducting joining the outlet of the load compressor 110 to the inlet of the HP compressor 120 and (in FIGS. 1,2,5 and 6 only) the ducting 226 and 229 joining the outlet of the HP compressor 220 to the recuperator 228 and the recuperator 228 to the combustor 230, may be much more compact than apparently indicated, and will certainly have curved bends instead of sharp corners.

Configuration 1

Referring now particularly to FIGS. 1 and 5, the load compressor 110, driven by motor 160, is sited in a convenient position next to an external surface 105 of an aircraft in which the auxiliary gas turbine engine is installed. The location may be, for example, the underside of the aircraft in front of or to the rear of a cargo or luggage hold. An air inlet 107 is provided in the surface 105, the inlet 107 being shaped to minimize distortion of the airflow into the load compressor 110. If required, the air inlet 107 may be provided with means, such as a mesh screen or inlet air particle separator (not shown), to prevent the ingestion of debris from the runway surface when the aircraft is on the ground.

As shown, the inlet 107 may be provided with an inlet air heater/cooler 170A, but its function may be supplemented or substituted for by air heater/coolers 170B or 170C located in alternative positions as mentioned above.

In configuration 1, the HP compressor 120 is driven through shaft 122 by an electric motor 124, which like motor 160 is powered from the generator 150. In the case of FIG. 1, this enables the HP compressor 120 to be sited close to the load compressor 110, so minimising the length of the duct 112 between the compressors and hence reducing aerodynamic losses. In the case of the alternative implementation of configuration 1, shown in FIG. 5, the aircraft cabin is utilised as a duct between load compressor 110 and HP compressor 120, so here the HP compressor 120 is placed closer to the other more downstream components of the auxiliary gas turbine engine, thereby reducing the length of ducting 126.

Ducting 126 carries the high pressure air from the outlet of HP compressor 120 to a recuperator 128. This comprises a heat exchange matrix built into ducting 145 which forms the outlet from the turbine 140. Passing through the recuperator 128; the high pressure air gains heat from exhaust gases exiting from the turbine 140. The recuperator 128 is provided to increase the efficiency of the engine cycle and enables fuel consumption to be reduced. If a lean burn combustion process is used, such pre-heating of the combustion air may also increase the stability of the combustion process.

Ducting 129 carries the heated high pressure air to the combustor 130. To minimise emissions of pollutants from the combustion process, the combustor is of the type known as a lean burn series staged combustor, in which sub-stoichiometric amounts of fuel are injected through successive arrays of injectors 131, 132, 133 into respective combustion stages for burning in the high pressure air, combustion only being completed in the last combustion stage. This enables careful control of combustion temperature in the successive stages to minimise production of oxides of nitrogen, while at the same time minimising production of carbon monoxide and unburned hydocarbons.

The products of combustion drive the turbine 140, and hence generator 150, before passing through ducting 145 and recuperator 128 to an exhaust nozzle 147 located in an external wall (not shown) of the aircraft. Preferably, the exhaust nozzle 147 is not located near to the air inlet 107 to avoid ingestion of the warm exhaust gases by the load compressor. The turbine/generator spool 140/155/150 may be located near to the external wall to minimise the length of the ducting 145, and hence duct aerodynamic losses, so avoiding excessive back pressure on the turbine 140.

Configurations 2 and 3

Referring now to FIGS. 2 and 6, configuration 2 will only be described insofar as it differs appreciably from configuration 1. The major difference from configuration 1 is the location of, and means for driving, the HP compressor 220. Specifically, the HP compressor 220 is driven directly by the turbine 240 through a shaft 222, instead of being driven by an electric motor powered by the generator. Hence, the HP compressor 220 is located close to the turbine 240 but is at a greater distance from the load compressor 210. Consequently, the ducting 212 joining the two compressors is shown longer than ducting 112 in configuration 1.

Referring now to FIGS. 3 and 7, configuration 3 will only be described insofar as it differs appreciably from configuration 2. The major differences from configuration 2 are the absences of a recuperator and a staged combustor. This enables adoption of a more compact arrangement of HP compressor 320 with combustor 330 and turbine 340, since the high pressure air from HP compressor 320 is fed directly to fuel injectors 331, 332 in an annular combustor 330 which circumscribes shaft 322. The combustion process may conveniently be of the rich burn rapid quench or rich burn diffusion controlled type. In the absence of preheating of combustion air by the exhaust gases from the turbine 340, they can exhaust via a duct 345 directly to atmosphere through exhaust nozzle 347.

Discussion of Thermodynamic Cycle Variations

The basic principle adopted is to obtain the required cabin pressure by running the load compressor 110 at a suitable pressure ratio and using the air heater/cooler 170A, 170B or 170C to adjust the cabin air temperature (taken from the load compressor exit through duct 115) to the required value. For each of the three basic configurations, the air heater/cooler can be placed in one or more of two or three possible positions, as previously mentioned.

First position of Air Heater/Cooler—in the inlet 107 to the load compressor 110. In this position heater/cooler 170A has a reversible heat pump 174A acting as a cooler over most of the flight envelope, heating only being required on the coldest days at sea level. This position requires a lower cooling/heating power than if it is placed in the exit from the load compressor, since each 1° C. change in inlet temperature is multiplied by the load compressor temperature ratio to produce a larger change in temperature at load compressor exit. When acting as a cooler, it also improves the cycle efficiency by reducing the power required to drive the compressors 110 and 120 to achieve the required pressure ratios.

It is a disadvantage for this location that the effects of the pressure loss through the heat exchanger matrix 72A are magnified by being at the inlet to the whole cycle.

A further disadvantage for this location is that the matrix would have to be provided with an anti-icing capability. One possible device to solve this problem comprises a microwave chamber, created by fitting gauzes to the matrix entry and exit: microwaves of the correct frequency (similar to that used for domestic microwave ovens) could then be generated inside this chamber, so melting any ice that forms without heating the air.

An alternative method for de-icing the heat exchange matrix 172A is periodically, as required, to run the heat pump in reverse for a short time to melt the ice. Alternatively, electric heating elements could be used. Such measures would temporarily degrade the efficiency of the engine and raise the temperature of the air at the outlet of the load compressor. However, the cabin air temperature could be corrected by use of the LP air heater/cooler 170C or the cabin air heater/cooler 170B, if present, in addition to the inlet air heater/cooler 170A. The cabin air heater/cooler 170B would not necessarily require much power input in order to correct the cabin air temperature, because electrical power could be used to pump coolant between the heat exchange matrix 172B and a further heat exchange matrix (not shown) located to reject heat to the atmosphere. If the engine included an LP air heater/cooler 170C at the exit of the load compressor instead of the cabin air heater/cooler 170B, heater/cooler 170C could be used to correct both the cabin air temperature and the temperature of the air being passed to the HP compressor 120. Again, this would not necessarily require much power, because heat from the heat exchange matrix 172C could be rejected to the atmosphere, in the same way as mentioned for heat exchange matrix 172B.

Second position of Air Heater/Cooler (FIGS. 1 to 3 only)—in the cabin air supply duct 15 taking the air from the load compressor exit to the aircraft cabin. This requires less cooling/heating power than if placed in the other two positions, because of the smaller air mass flow rates. A heat exchanger transferring heat from the position in the cabin air supply duct 15 to ambient air would be sufficient over most of the flight envelope. Heating would be required on the coldest days at sea level, and refrigeration on days near or above standard sea level day temperatures. No air heater/cooler matrix pressure loss effects are felt by the cycle, apart from having to run the load compressor 110 at a higher pressure ratio in order to achieve the required cabin pressure. No anti-icing would be necessary. However, no cycle efficiency benefits accrue from this position.

Third position of Air Heater/Cooler—in the exit from the load compressor 110. Again, the heater/cooler 170C include a reversible refrigeration plant 174C. This position needs more cooling/heating power than the first position at the air inlet because of the multiplier effect of the load compressor temperature ratio. Even so, a heat exchanger transferring heat from the load compressor exit to ambient air would be sufficient over most of the flight envelope. Heating would be required on very cold days at sea level, and refrigeration on days near or above standard sea level day temperatures. Advantages are that the effects of loss of pressure in the air heater/cooler matrix are reduced, and no anti-icing would be needed. Some cycle efficiency benefits accrue when acting as a cooler due to reduction of the power necessary to drive the HP compressor. Overall, however, this position for the heat exchanger matrix 172C is a third preference due to the requirement for greater cooling and heating power than the other two positions.

As already mentioned for anti-icing of the heat exchange matrix 170A, an air heater/cooler may be placed in more than one of the above positions, and heating or cooling carried out in the optimum position(s) for any given atmospheric and engine conditions.

Thermodynamic Cycle Details

Following are thermodynamic cycle data for configurations 1 to 3 in FIGS. 1 to 3, wherein the heat exchange matrix of the air heater/cooler is located in positions A or B mentioned above. Thermodynamic data in respect of the position C, at the outlet of the load compressor, will be listed later in respect of FIGS. 5 to 7.

(i) Heat Exchange Matrix in Inlet to load compressor

With a 5% pressure loss in the intake 107, a 6% pressure loss in the heater/cooler 170A and a 15% pressure loss in the duct 15 between load compressor exit and the aircraft cabin, the operating conditions of the load compressor 110 and air heater/cooler 170A at the conditions sea level static (SLS) and cruise (35000 feet, 0.8 Mach Number) on a standard day are as shown in Table 1.

TABLE 1

|  | SLS | Cruise |
| --- | --- | --- |
| Inlet Air Mass Flow | 12 lb/s | ~7.7 lb/s |
| Heater/Cooler Temperature Drop | 14° C. | 30° C. |
| Refrigeration Power | 11 kW | ~24 kW |
| Inlet Flow Function (WvT/P) | 15.1 | ~24 |
| Load Compressor Pressure Ratio | 1.29 | 2.68 |
| Load Compressor Power | 132 kW | ~300 kW |

Note that a compressor polytropic efficiency of 90% has been assumed. The load compressor 110 is conveniently powered by an electric motor 160, assumed to be 95% efficient (other methods are possible, including hydraulic, pneumatic or indirect mechanical drive), while the refrigeration plant 174A is assumed for calculation purposes to be an ammonia cycle with 110° C. temperature drops across the evaporator and condenser heat exchangers; obviously, other more modern refrigerants with appropriate properties could be used instead. Note that, when the outside air temperature is significantly less than standard, the air heater/cooler will have to heat the air in order to obtain the correct cabin conditions. Alternatively, the air heater/cooler 170A could be switched off, and the load compressor could be run at a higher pressure ratio than before in order to produce the necessary outlet temperature. A throttle valve (not shown) in cabin air supply duct 115 could then be used to reduce the pressure to that required. This method has the disadvantage that more power would be required to drive the load compressor, thus increasing the size and weight of the motor 160 and generator 150.

Air from the exit from the load compressor 110 is also fed to the HP compressor 120. In Configuration 1, HP and driven by its own electric motor 124, or alternatively it could be driven through gearing by the motor 160 which powers the load compressor. In configuration 2, HP compressor 220 is driven by a shaft 222 connected to the turbine 240; in the latter cases, extra ducting 212 may be required if the load compressor 210 and HP compressor 220 positioned in different areas of the airframe. The pressure ratio of the HP compressor 220 has been selected such that, at the design point of the auxiliary gas turbine engine (sea level static, ISA with 15 øC. ambient temperature), the pressure ratio across the final nozzle is approximately 1.05; this has been done to allow a reasonable size final nozzle to be fitted. The relevant performance parameters of the HP compressor are as shown in Table 2.

TABLE 2

|  | SLS | Cruise |
|---|---|---|
| Configuration 1 | | |
| inlet Air Mass Flow | 8.25 lb/s | 3.93 lb/s |
| Inlet Flow Function (WvT/P) | 8.46 | 5.41 |
| HP Compressor Pressure Ratio | 2.80 | 1.80 |
| RP Compressor Power | 454 kW | 114 kW |
| Configuration 2 | | |
| Inlet Air Mass Flow | 8.25 lb/s | 4.08 lb/s |
| Inlet Flow Function (WvT/P) | 110.52 | 6.97 |
| RP Compressor Pressure Ratio | 2.60 | 1.73 |
| RP Compressor Power | 396 kW | 1105 kW |
| Configuration 3 | | |
| Inlet Air Mass Flow | 8.25 lb/s | 3.91 lb/s |
| Flow Function (WvT/P) | 110.52 | 6.69 |
| HP Compressor Pressure Ratio | 2.05 | 1.31 |
| HP Compressor Power | 286 kW | 47 kW |

A compressor polytropic efficiency of 90% has been assumed in all cases in Table 2. Note that the HP compressor power is electrical power (assuming a motor efficiency of 95%) in the case of configuration 1, but mechanical power in the cases of configurations 2 and 3. A duct loss of 20% between the load and HP Compressors has been assumed for configurations 2 and 3, but only 0.5% for configuration 1.

In Configurations 1 and 2, the air then enters a recuperator 128, 228 (via a long duct 126,226 if necessary, in configuration 1). The purpose of the recuperator 128, 228 is to use the energy in the gases leaving the turbine 140,240 to heat up the air from the HP compressor 120, 220 before it enters the combustor 130,330 thus reducing the fuel required. The recuperator is assumed to introduce a 4% pressure drop, and have a 70% effectiveness; the relevant performance parameters are given in Table 3 below.

TABLE 3

|  | SLS | Cruise |
|---|---|---|
| Configuration 1 | | |
| Inlet Air Mass Flow | 7.84 lb/s | 3.74 lb/s |
| Temperature Rise | 463° C. | 411° C. |
| Heat Transfer | 919 CHU/s | 383 CHU/s |

TABLE 3-continued

|  | SLS | Cruise |
|---|---|---|
| Configuration 2 | | |
| Inlet Air Mass Flow | 7.84 lb/s | 3.88 lb/s |
| Temperature Rise | 483° | 425° C. |
| Heat Transfer | 959 CHU/s | 411 CHU/s |

The slight reduction in airflow between HP compressor entry and recuperator entry is caused by a cooling air bleed of 5%, assumed to be necessary to keep the metal temperatures of the hot side of the recuperator within desirable values.

A combustion chamber 130, 230, 330 is provided in all three configurations, in which fuel is burned before entry to the turbine 140, 240, 340. The relevant combustion chamber performance parameters for all three configurations are given in Table 4 below.

TABLE 4

|  | SLS | Cruise |
|---|---|---|
| Configuration 1 | | |
| Inlet Air Mass Flow | 7.84 lb/s | 3.74 lb/s |
| Inlet Temperature | 874 K | 769 K |
| i Temperature Rise | 426° C. | 531° C. |
| Outlet Temperature | 1300 K | 1300 K |
| Fuel Flow | 346 lb/hr | 205 lb/hr |
| Fuel/Air Ratio | .0123 | .0152 |
| Configuration 2 | | |
| Inlet Air Mass Flow | 7.84 lb/s | 3.871 b/s |
| Inlet Temperature | 885 K | 779 K |
| Temperature Rise | 415° C. | 521° C. |
| Outlet Temperature | 1300 K | 1300 K |
| Fuel Flow | 338 lb/hr | 208 lb/hr |
| Fuel/Air Ratio | .0120 | .0149 |
| Configuration 3 | | |
| Inlet Air Mass Flow | 8.25 lb/s | 3.91 lb/s |
| D Inlet Temperature | 373 K | 323 K |
| Temperature Rise | 927° C. | 977° C. |
| Outlet Temperature | 1300 K | 1300 K |
| Fuel Flow | 760 lb/hr | 378 lb/hr |
| Fuel/Air Ratio | .0255 | .0268 |

In all cases, a combustion chamber pressure loss of 4% has been assumed, as well as 100% combustion efficiency and a fuel calorific value of 10222 CHU/lb. The level of outlet temperature (which equals the turbine entry temperature) is set at a level that, with modern materials, would require little or no turbine cooling air.

The products of combustion then enter the turbine, which extracts power from the hot, high-pressure gases leaving the combustion chamber to drive an electrical generator and, in Configurations 2 and 3, also provides shaft power to drive the HP compressor. The relevant performance parameters for the turbine in each of the three configurations are given in Table 5.

TABLE 5

|  | SLS | Cruise |
|---|---|---|
| Configuration 1 | | |
| Inlet Air Mass Flow | 7.93 lb/s | 3.79 lb/s |
| Inlet Flow Function (WvT/P) | 8.24 | 8.24 |

TABLE 5-continued

|  | SLS | Cruise |
|---|---|---|
| Turbine Pressure Ratio | 2.17 | 3.98 |
| Turbine Non-Dimensional Power | .0432 | .0717 |
| Turbine Power | 847 kW | 671 kW |
| Generator Power | 805 kW | 638 kW |
| Configuration 2 | | |
| Inlet Air Mass Flow | 7.93 lb/s | 3.93 lb/s |
| Inlet Flow Function (WvT/P) | 8.92 | 8.92 |
| Turbine Pressure Ratio | 1.99 | 3.67 |
| Turbine Non-Dimensional Power | .0388 | .0681 |
| Turbine Power | 759 kW | 661 kW |
| Generator Power | 346 kW | 528 kW |
| Configuration 3 | | |
| Inlet Air Mass Flow | 8.46 lb/s | 4.02 lb/s |
| Inlet Flow Function (WvT/P) | 11.47 | 11.47 |
| Turbine Pressure Ratio | 1.72 | 3.06 |
| Turbine Non-Dimensional Power | .0311 | .0601 |
| Turbine Power | 650 kW | 596 kW |
| Generator Power | 346 kW | 521 kW |

In all cases, a turbine adiabatic efficiency of 89% has been assumed, as well as a generator efficiency of 95%. As explained above, the turbine is assumed to be uncooled at the level of turbine entry temperature (1300 ØK) selected.

The combustion products then pass into the hot side of the recuperator in configurations 1 and 2. Like the cold side, the hot side is assumed to introduce a 4% pressure drop. Table 6 gives the relevant performance parameters:

TABLE 6

|  | SLS | Cruise |
|---|---|---|
| Configuration 1 | | |
| Inlet Air Mass Flow | 8.35 lb/s | 3.99 lb/s |
| Temperature Drop | 406° C. | 361° C. |
| Configuration 2 | | |
| Inlet Air Mass Flow | 8.34 lb/s | 4.14 lb/s |
| Temperature Drop | 423° C. | 373 C |

The slight rise in flow between the turbine exit and recuperator inlet is due to the return of the cooling air which was taken off immediately upstream of the cold side of the recuperator.

All three configurations then exhaust the combustion products through a duct 145,245,345 then through a final nozzle 147,247,347 with the characteristics shown in Table 7.

TABLE 7

|  | SLS | Cruise |
|---|---|---|
| Configuration 1 | | |
| Inlet Air Mass Flow | 8.35 lb/s | 3.99 lb/s |
| Nozzle Pressure Ratio | 1.043 | 1.158 |
| Nozzle Geometric Area | 87.3 square inches | |
| Gross Thrust | 1107 lbf | 881 bf |
| Net Thrust | 1107 lbf | −97 lbf |
| Configuration 2 | | |
| Inlet Air Mass Flow | 8.34 lb/s | .13 lb/s |
| Nozzle Pressure Ratio | 1.052 | 1.204 |
| Nozzle Geometric Area | 80.0 square inches | |
| Gross Thrust | 117 lbf | 1103 lbf |
| Net Thrust | 117 lbf | −86 lbf |

TABLE 7-continued

|  | SLS | Cruise |
|---|---|---|
| Configuration 3 | | |
| Inlet Air Mass Flow | 8.46 lb/s | 4.02 lb/s |
| Nozzle Pressure Ratio | 1.052 | 1.193 |
| Nozzle Geometric Area | 106.2 square inches | |
| Gross Thrust | 157 lbf | 130 lbf |
| Net Thrust | 157 lbf | −56 lbf |

In all cases, nozzle discharge coefficients of 0.99 and nozzle velocity coefficients of 0.99 have been assumed. The negative levels of net thrust (i.e. increases in drag) at cruise would be offset by the thrust produced when stale air is exhausted from the aircraft cabin through a separate nozzle: this force is normally accounted as 'negative' aircraft drag.

(ii) Heat Exchange Matrix in Cabin Air Supply Duct

Tables 8 to 14 give thermodynamic cycle details for the three configurations when the heat exchange matrix 172B of the heater/cooler 170B is in the cabin air supply duct 115 leading to the aircraft cabin. All the details of operation and assumptions made are identical to those given above, except that there is no heat exchanger matrix pressure loss at inlet to the load compressor 110 and the duct loss between load compressor exit and the aircraft cabin has been increased to 208 to allow for the presence of the heat exchanger matrix 172B. In cases where the ambient air temperature is appreciably lower than the desired cabin air temperature, a simple transfer of heat from the compressed air in duct 115 to the atmosphere surrounding the aircraft will lower its temperature sufficiently to obtain the desired cabin temperature. In cases where the cabin temperature is less than the ambient temperature, a refrigeration plant 174B, similar to that used in conjunction with heat exchanger matrix 172A, can be used to achieve the required extra cooling. The heat exchanger matrix is assumed to be able to cool the air in duct 115 to within 110° C. of the ambient temperature. In cases where the load compressor exit temperature is lower than the desired cabin air temperature, heating of the air in the cabin air supply duct 115 can be accomplished either by a heat pump extracting heat from the atmosphere surrounding the aircraft or by electrical heating elements drawing power from the electrical generator.

TABLE 8

| LOAD COMPRESSOR ENTRY | SLS | Cruise |
|---|---|---|
| Inlet Air Mass Flow | 2 lb/s | −7.9 lb/s |
| Inlet Flow Function WvT/P) | 14.59 | −25 |
| Load Compressor Press. Ratio | 1.26 | 2.63 |
| Load Compressor Power | 12B kW | −335 kW |

TABLE 9

| HP COMPRESSOR ENTRY | SLS | Cruise |
|---|---|---|
| Configuration 1 | | |
| Inlet Air Mass Elow | 8.25 lb/s | 4.25 lb/s |
| Inlet Flow Function (WvT/P) | 8.28 | 5.95 |
| HP Compressor Pressure Ratio | 2.60 | 1.80 |
| RP Compressor Power | 435 kW | 140 kW |
| Configuration 2 | | |
| Inlet Air Mass F1OW | 8.25 lb/s | 4.33 lb/s |
| Inlet Flow Function (WvT/P) | 110.30 | 7.53 |

TABLE 9-continued

| HP COMPRESSOR ENTRY | SLS | Cruise |
|---|---|---|
| HP Compressor Pressure Ratio | 2.40 | 1.69 |
| HP Compressor Power | 374 kW | 120 kW |
| Configuration 3 | | |
| Inlet Air Mass Flow | 8.25 lb/s | 4.06 lb/s |
| Flow Function (WvT/P) | 10.30 | 7.07 |
| HP Compressor Pressure Ratio | 1.90 | 1.26 |
| HP Compressor Power | 264 kW | 46 kW |

TABLE 10

| RECUPERATOR COLD SIDE | SLS | Cruise |
|---|---|---|
| Configuration 1 | | |
| Inlet Air Mass Flow | 7.84 lb/s | 4.04 lb/s |
| Temperature Rise | 463° C. | 380° C. |
| Heat Transfer | 921 CHU/s | 385 CHU/s |
| Configuration 2 | | |
| Inlet Air Mass Flow | 7.84 lb/s | 4.11 lb/s |
| Temperature Rise | 483° C. | 397° C. |
| Heat Transfer | 962 CHU/s | 409 CHU/s |

TABLE 11

| COMBUSTION CHAMBER | SLS | Cruise |
|---|---|---|
| Configuration 1 | | |
| Inlet Air Mass Flow | 7.84 lb/s | 4.04 lb/s |
| Inlet Temperature | 882 K | 7.84 K |
| Temperature Rise | 418° C. | 516° C. |
| Outlet Temperature | 1300 K | 1300 K |
| Fuel Flow | 340 lb/hr | 215 lb/hr |
| Fuel/Air Ratio | .0121 | .0148 |
| Configuration 2 | | |
| Inlet Air Mass Flow | 7.84 lb/s | 4.11 lb/s |
| Inlet Temperature | 893 K | 793 K |
| Temperature Rise | 407° C. | 507° C. |
| Outlet Temperature | 1300 K | 1300 K |
| Fuel Flow | 332 lb/hr | 215 lb/hr |
| Fuel/Air Ratio | .0118 | .0145 |
| Configuration 3 | | |
| Inlet Air Mass Flow | 8.25 lb/s | 4.06 lb/s |
| Inlet Temperature | 380 K | 360 K |
| Temperature Rise | 920° C. | 940° C. |
| Outlet Temperature | 1300 K | 1300 K |
| Fuel Flow | 753 lb/hr | 378 lb/hr |
| Fuel/Air Ratio | .0253 | .0258 |

TABLE 12

| TURBINE | SLS | Cruise |
|---|---|---|
| Configuration 1 | | |
| Inlet Air Mass Flow | 7.93 lb/s | 4.10 lb/s |
| Inlet Flow Function (WvT/P) | 8.50 | 8.50 |
| Turbine Pressure Ratio | 2.10 | 3.98 |
| Turbine Non-Dimensional Power | .0414 | .0718 |
| Turbine Power | 811 kW | 726 kW |
| Generator Power | 771 kW | 689 kW |
| Configuration 2 | | |
| Inlet Air Mass Flow | 7.93 lb/s | 4.17 lb/s |
| Inlet Flow Function (WvT/P) | 9.26 | 9.26 |
| Turbine Pressure Ratio | 1.92 | 3.66 |

TABLE 12-continued

| TURBINE | SLS | Cruise |
|---|---|---|
| Turbine Non-Dimensional Power | .0369 | .0680 |
| Turbine Power | 722 kW | 700 kW |
| Generator Power | 331 kW | 551 kW |
| Configuration 3 | | |
| Inlet Air Mass Flow | 8.46 lb/s | 4.17 lb/s |
| Inlet Flow Function (WvT/P) | 11.85 | 11.85 |
| Turbine Pressure Ratio | 1.67 | 3.04 |
| Turbine Non-Dimensional Power | .0293 | .0597 |
| Turbine Power | 612 kW | 614 kW |
| Generator Power | 331 kW | 540 kW |

TABLE 13

| RECUPERATOR HOT SIDE | SLS | Cruise |
|---|---|---|
| Configuration 1 | | |
| Inlet Air Mass Flow | 8.34 lb/s | .31 lb/s |
| Temperature Drop | 407° C. | 335° C. |
| Configuration 2 | | |
| Inlet Air Mass Flow | 8.34 lb/s | 4.39 lb/s |
| Temperature Drop | 424° C. | 349 C |

TABLE 14

| NOZZLE | SLS | Cruise |
|---|---|---|
| Configuration 1 | | |
| Inlet Air Mass Flow | 8.34 lb/s | 4.31 lb/s |
| Nozzle Pressure Ratio | 1.047 | 1.211 |
| Nozzle Geometric Area | 83.7 square inches | |
| Gross Thrust | 112 lbf | 111 lbf |
| Net Thrust | 112 lbf | −82 lbf |
| Configuration 2 | | |
| Inlet Air Mass Flow | 8.34 lb/s | 4.39 lb/s |
| Nozzle Pressure Ratio | 1.050 | 1.233 |
| Nozzle Geometric Area | 81.4 square inches | |
| Gross Thrust | 116 lbf | 119 lbf |
| Net Thrust | 116 lbf | −77 lbf |
| Configuration 3 | | |
| Inlet Air Mass Flow | 8.46 lb/s | 4.17 lb/s |
| Nozzle Pressure Ratio | 1.052 | 1.205 |
| Nozzle Geometric Area | 1107.0 square inches | |
| Gross Thrust | 157 lbf | 138 lbf |
| Net Thrust | 157 lbf | −511 lbf |

Alternative Configurations 1 to 3, FIGS. 5 to 7

In FIGS. 1 to 3, the cabin air supply duct 15 is an offtake from the main air flow in duct 112 between load compressor 110 and HP compressor 120. However, all three alternative implementations in FIGS. 5 to 7 use the aircraft cabin to carry some or all of the air from the load compressor to the HP compressor. Relative to FIGS. 1 to 3 respectively, ducting 112 is replaced by optional ducting 12' (necessary only to reduce the pressure ratio of the turbine 140 as explained below), the cabin air heater/cooler 170B has been removed, and the connection between the load compressor 110 and the HP compressor 120 is made through the aircraft cabin 113, 213, 313. This is feasible since, for all configurations with heater/coolers in positions A and/or C, the pressure and temperature of the air passing between the load compressor 110 and the HP compressor 120 is at the required values for passenger comfort.

The advantage of these alternative implementations is that the airflow through the auxiliary gas turbine engine is greatly reduced relative to FIGS. 1 to 3, resulting in smaller and lighter components. Their disadvantage is that much higher turbine 140 pressure ratios are needed, because the electrical offtake power to the rest of the aircraft is a much higher fraction of the power output of the generator 150. Turbine pressure ratios can be reduced by either supplying more airflow through the aircraft cabin, or by introducing ducting 12' in parallel to the cabin 113, thereby increasing the airflow that can pass from the load compressor 110 to the HP compressor 120.

Tables 15 to 21 give thermodynamic cycle data for alternative implementations of configurations 1 to 3 in FIGS. 5 to 7 respectively, assuming that the heater/cooler 170A is situated to heat or cool the air before it enters the load compressor 110. All other operational details and assumptions made are as previously stated with reference to FIGS. 1 to 3, except that a 5% pressure loss has been introduced between the aircraft cabin outlet and the HP compressor, and allowance has been made for metabolic heat from the aircraft occupants (assumed to be 1100 Watts each). Note that alternative implementation of configuration 1 in FIG. 5 is only practical if aerodynamic losses in duct 126 are kept low; it may therefore offer few, if any, advantages over the alternative implementation of configuration 2 shown in FIG. 6.

TABLE 15

| LOAD COMPRESSOR ENTRY | SLS | Cruise |
|---|---|---|
| Inlet Air Mass Flow | 3.75 lb/s | 3.75 lb/s |
| Inlet Flow Function (WvT/P) | 4.73 | 11.74 |
| Load Compressor Press. Ratio | 1.29 | 2.68 |
| Load Compressor Power | 41 kW | 144 kW |

TABLE 16

| HP COMPRESSOR ENTRY | SLS | Cruise |
|---|---|---|
| Configuration 1 | | |
| Inlet Air Mass Flow | 3.75 lb/s | 3.75 lb/s |
| Inlet Flow Function (WvT/P) | 4.72 | 6.32 |
| HP Compressor Pressure Ratio | 6.00 | 7.71 |
| HP Compressor Power | 423 kW | 503 kW |
| Configuration 2 | | |
| Inlet Air Mass Flow | 3.75 lb/s | 3.75 lb/s |
| Inlet Flow Function (WvT/P) | 4.72 | 6.32 |
| HP Compressor Pressure Ratio | 4.00 | 4.92 |
| HP Compressor Power | 291 kW | 346 kW |
| Configuration 3 | | |
| Inlet Air Mass Flow | 3.75 lb/s | 3.75 lb/s |
| Inlet Flow Function (WvT/P) | 4.72 | 6.32 |
| HP Compressor Pressure Ratio | 3.10 | 3.64 |
| HP Compressor Power | 227 kW | 267 kW |

TABLE 17

| RECUPERATOR COLD SIDE | SLS | Cruise |
|---|---|---|
| Configuration 1 | | |
| Inlet Air Mass Flow | 3.56 lb/s | 3.56 lb/s |
| Temperature Rise | 264° C. | 86° C. |
| Heat Transfer | 240 CHU/s | 78 CHU/s |
| Configuration 2 | | |
| Inlet Air Mass Flow | 3.56 lb/s | 3.56 lb/s |

TABLE 17-continued

| RECUPERATOR COLD SIDE | SLS | Cruise |
|---|---|---|
| Temperature Rise | 362° C. | 135° C. |
| Heat Transfer | 328 CHU/s | 120 CHU/s |

TABLE 18

| COMBUSTION CHAMBER | SLS | Cruise |
|---|---|---|
| Configuration 1 | | |
| Inlet Air Mass Flow | 3.56 lb/s | 3.56 lb/s |
| Inlet Temperature | 805 K | 670 K |
| Temperature Rise | 495° C. | 524° C. |
| Outlet Temperature | 1300 K | 1193 K |
| Fuel Flow | 182 lb/hr | 187 lb/hr |
| Fuel/Air Ratio | .0142 | .0146 |
| Configuration 2 | | |
| Inlet Air Mass Flow | 3.56 lb/s | 3.56 lb/s |
| Inlet Temperature | 839 K | 643 K |
| Temperature Rise | 461° C. | 454° C. |
| Outlet Temperature | 1300 K | 1097 K |
| Fuel Flow | 170 lb/hr | 159 lb/hr |
| Fuel/Air Ratio | .0133 | .0124 |
| Configuration 3 | | |
| Inlet Air Mass Flow | 3.56 lb/s | 3.56 lb/s |
| Inlet Temperature | 440 K | 463 K |
| Temperature Rise | 860° C. | 553° C. |
| Outlet Temperature | 1300 K | 1017 K |
| Fuel Flow | 305 lb/hr | 188 lb/hr |
| Fuel/Air Ratio | .0238 | .0146 |

TABLE 19

| TURBINE | SLS | Cruise |
|---|---|---|
| Configuration 1 | | |
| Inlet Air Mass Flow | 3.61 lb/s | 3.61 lb/s |
| Inlet Flow Function (WvT/P) | 1.70 | 1.70 |
| Turbine Pressure Ratio | 4.78 | 11.34 |
| Turbine Non-Dimensional Power | .0795 | .1113 |
| Turbine Power | 709 kW | 912 kW |
| Generator Power | 674 kW | 866 kW |
| Configuration 2 | | |
| Inlet Air Mass Flow | 3.61 lb/s | 3.61 lb/s |
| Inlet Flow Function (WvT/P) | 2.55 | 2.55 |
| Turbine Pressure Ratio | 3.18 | 7.43 |
| Turbine Non-Dimensional Power | .0617 | .0962 |
| Turbine Power | 550 kW | 723 kW |
| Generator Power | 246 kW | 358 kW |
| Configuration 3 | | |
| Inlet Air Mass Flow | 3.65 lb/s | 3.62 lb/s |
| Inlet Flow Function (WvT/P) | 3.17 | 3.17 |
| Turbine Pressure Ratio | 2.70 | 6.72 |
| Turbine Non-Dimensional Power | .0540 | .0922 |
| Turbine Power | 486 kW | 643 kW |
| Generator Power | 246 kW | 358 kW |

TABLE 20

| RECUPERATOR HOT SIDE | SLS | Cruise |
|---|---|---|
| Configuration 1 | | |
| Inlet Air Mass Flow | 3.80 lb/s | 3.80 lb/s |
| Temperature Drop | 236° C. | 78° C. |

TABLE 20-continued

| RECUPERATOR HOT SIDE | SLS | Cruise |
|---|---|---|
| Configuration 2 | | |
| Inlet Air Mass Flow | 3.80 lb/s | 3.80 lb/s |
| Temperature Drop | 321° C. | 123° C. |

TABLE 21

| NOZZLE | SLS | Cruise |
|---|---|---|
| Configuration 1 | | |
| Inlet Air Mass Flow | 3.80 lb/s | 3.80 lb/s |
| Nozzle Pressure Ratio | 1.045 | 1.793 |
| Nozzle Geometric Area | 39.6 square inches | |
| Gross Thrust | 50 lbf | 170 lbf |
| Net Thrust | 50 lbf | 79 lbf |
| Configuration 2 | | |
| Inlet Air Mass Flow | 3.80 lb/s | 3.79 lb/s |
| Nozzle Pressure Ratio | 1.045 | 1.747 |
| Nozzle Geometric Area | 38.9 square inches | |
| Gross Thrust | 50 lbf | 159 lbf |
| Net Thrust | 50 lbf | 68 lbf |
| Configuration 3 | | |
| Inlet Air Mass Flow | 3.84 lb/s | 3.80 lb/s |
| Nozzle Pressure Ratio | 1.048 | 1.567 |
| Nozzle Geometric Area | 47.6 square inches | |
| Gross Thrust | 64 lbf | 154 lbf |
| Net Thrust | 64 lbf | 63 lbf |

Aircraft Types suitable for Configurations 1 to 3

All three configurations have features which may make each more suited to particular types of aircraft.

Configuration 1 is suitable for a small aircraft in which, because the demands are lower, the machinery will be smaller and lighter and the increased configurational flexibility offered by the non-mechanical driving connection of the HP compressor may make installation easier.

Configuration 2 is suitable for a long-range aircraft, in which the extra weight of the recuperator is more than offset by the fuel savings that result.

Configuration 3 is suitable for a short-haul aircraft, for which weight and complexity savings are more important than fuel savings.

Aircraft Equipment Changes Relative to Current Practice

Some equipment currently installed on aircraft which have APUs can be deleted if the auxiliary gas turbine engines of the present invention are installed in place of conventional APUs. Such equipment is:

(a) Main engine air offtake systems for aircraft pressurisation and air supply and the associated ducting in engine support pylons, wings and fuselage.

(b) Current air conditioning packs, required for pressure reduction and temperature adjustment of air taken from the main engines.

To maximise the benefits accruing from use of the auxiliary gas turbine engines described above, air offtakes and ducting for supply of hot air to aircraft flying surfaces to combat ice formation should also be deleted. Such ducting, coming from engines or APUs, is present in wings and tail surfaces and includes associated safety features, such as blow-off panels and isolation valves. To replace these conventional anti-icing measures, it is suggested that known types of electrical de-icing systems be installed, such as electrical impulse or thin film resistance elements, powered from the generators 50 in the auxiliary gas turbine engines.

I claim:

1. An auxiliary gas turbine engine for an aircraft, including;

an air intake, a load compressor for compressing air supplied from the air intake, a cabin air supply duct for supplying air from the load compressor to the aircraft cabin, a combustor for burning fuel in air supplied from the load compressor, a turbine driven by the combustion products of the combustor, a turbine exhaust means, variable speed drive means for transferring power from the turbine to drive the load compressor, and heat exchanger means for adjusting the temperature of the air flowing through the cabin air supply duct, said load compressor being in flow series with a high pressure compressor, said load compressor supplying air to the cabin air supply duct and the high pressure compressor, and the high pressure compressor supplying air to the combustor.

2. An engine according to claim 1, in which the high pressure compressor is driven by transfer of power from the turbine through further variable speed drive means.

3. An engine according to claim 2, in which the HP compressor is positioned remotely from the combustor and ducting is provided to carry air between the compressor and the combustor.

4. An engine according to claim 2, in which the further variable speed drive means for transmitting power from the turbine to the HP compressor comprises an electrical generator driven directly by the turbine, and an electric motor driven by the electrical output of the generator, the electric motor in turn driving the compressor.

5. An engine according to claim 1, in which the load compressor is positioned remotely from the high pressure compressor and ducting is provided to carry air between the compressors.

6. An engine according to claim 1, in which the variable speed drive means for transmitting power from the turbine to the load compressor comprises an electrical generator driven directly by the turbine, and an electric motor driven by the electrical output of the generator, the electric motor in turn driving the compressor.

7. An engine according to claim 6 or 4 in which the electrical generator is connected to electrical equipment on the aircraft to supply the electrical power requirements of the aircraft.

8. An engine according to claim 1, in which the heat exchanger means includes heat pump means powered through drive means from the turbine.

9. An engine according to claim 8, in which the drive means for the heat pump comprises an electric motor driven by the turbine-driven electrical generator.

10. An engine according to claim 1, in which the heat exchanger means includes at least one heat exchanger matrix located adjacent the load compressor.

11. An engine according to claim 10, in which the heat exchanger matrix incorporates electrical heating elements powered from the generator.

12. An engine according to claim 1, in which a heat exchanger matrix of the heat exchanger means is located in the air intake to adjust the air temperature before it enters the load compressor.

13. An engine according to claim 1, in which an exhaust heat recuperator is employed to preheat the air for combustion before it enters the combustor.

14. An engine according to claim 13, in which the recuperator comprises a heat exchange matrix built into an outlet duct from the turbine.

15. An auxiliary gas turbine engine for a passenger carrying aircraft, comprising:

a load compressor;

a cabin air supply duct which supplies at least some of the air from the load compressor to a passenger cabin of the aircraft;

a high pressure (HP) compressor for further compressing at least some of the air from the load compressor;

a combustor for burning fuel in the air supplied from the HP compressor to produce combustion gases;

a turbine for extracting power from the combustion gases;

an electrical generator driven by the turbine;

an electric motor driven by the electrical output of the generator, the electric motor in turn driving the load compressor; and at least one air heater/cooler for heating and cooling the air at least one of before and after it passes through the load compressor, the at least one air heater/cooler comprising a heat exchanger matrix for exchanging heat with air flowing therethrough and a reversible heat pump which is electrically powered from the generator so that it can cool and heat the air passing through the matrix, the load compressor and the at least one heat exchanger being adapted to produce air at the required pressure and temperature for supply to the aircraft passenger cabin.

16. An engine according to claim 15, in which an exhaust heat recuperator is employed to preheat the air for combustion before it enters the combustor.

17. An engine according to claim 16, in which the recuperator comprises a heat exchange matrix built into an outlet duct from the turbine.

18. An engine according to claim 15, in which a passenger cabin is provided and said passenger cabin is utilized to carry at least some of the air between the load compressor and the high pressure compressor.

19. An aircraft having installed therein an auxiliary gas turbine engine according to any one of claims 1, 3, 15 or 18.

* * * * *